INVENTOR
WILLIAM C. DERSCH, Jr.
BY David Teschner
ATTORNEY

INVENTOR
WILLIAM C. DERSCH, Jr.
BY David Teachm
ATTORNEY

SIGNAL TRANSLATING APPARATUS

Filed Nov. 22, 1965 4 Sheets-Sheet 3

INVENTOR
WILLIAM C. DERSCH, JR.
BY David [signature]
ATTORNEY

Sept. 30, 1969 W. C. DERSCH, JR 3,470,321

SIGNAL TRANSLATING APPARATUS

Filed Nov. 22, 1965 4 Sheets-Sheet 4

INVENTOR
WILLIAM C. DERSCH, Jr.
BY David [signature]
ATTORNEY

United States Patent Office 3,470,321
Patented Sept. 30, 1969

3,470,321

SIGNAL TRANSLATING APPARATUS

William C. Dersch, Jr., 8 Westerly Ave.,
Madison, N.J. 07940

Filed Nov. 22, 1965, Ser. No. 508,973
Int. Cl. H04m 1/24
U.S. Cl. 179—1 14 Claims

ABSTRACT OF THE DISCLOSURE

A system is disclosed which includes a voice recognition section responsive to voice generated electric signals to provide output signals indicative of the manner in which the voice signals have been interpreted. These output signals can then be utilized for the input of data to a data processing apparatus. As the word identification signals are being generated by the recognition section during the actual formation of the individual sounds making up a word, they are substantially simultaneously used to modify a portion of the original voice generated signals so that such modified portion can be used to generate a signal to be monitored by the person using the equipment. In one preferred embodiment headphones are disclosed as the monitoring device with the system operating to provide the audio signals to the speaker so rapidly, and in fact prior to completion of complete word identification, that to the speaker the audio signals are subjectively simultaneous with the words being spoken. Thus the operator knows immediately whether or not the spoken word has been properly recognized by the system, and in fact can be forced to correct a word even before the word has been completely spoken.

The fact that many data processing and calculating machines operate with the binary form of notation, whereas the human operator is to a large extent skilled only in the decimal system of notation has long limited the utility of certain data processing and computing devices to persons able to communicate with the device in the binary code. Early in the usage of such devices it was necessary for persons to become skilled in the use of the binary system of notation and convert information mentally from decimal to binary form before entry into such machines. Later converting or translating devices became available which allowed the operator to operate a keyboard or other similar device in the decimal scale of notation and have it automatically converted or translated into the required binary form. Such converters or translators extended the utility of data processing devices beyond those persons who had basic skills and understanding of the binary system of notation.

Further, with input devices of the type mentioned, that is keyboards or the like, it was necessary to fixedly mount the input device adjacent the data processing or computing device. In order to operate an input device so located, the operator's attention must be focused upon the keyboard or a touch system must be developed which limited the utility of the input device with respect to unskilled operators. The necessity of watching the input device also limited the ability of the operator to read meters or other indicating instruments or do anything else which might divert his attention from the entry of information. In a typical arrangement, such as a supermarket, where it is necessary for an operator, in this case a cashier, to enter the numerical value of goods purchased into a sales register or the like, it is necessary for the operator to pickup or otherwise handle the item, note the marked price, and then enter on the keys the amount noted. Unless the operator is extremely skillful it is not possible for the operator to both view a further item at the same time as the past item amount was being entered into the sales register, nor to handle the item until the data entry is complete.

Broadly stated, the invention herein permits an operator complete freedom with respect to the input of information to a data processing or computing device by permitting information to be entered by means of the human speaking voice in the language normally used by the operator. Thus the disadvantages set out above, of knowledge and usage of special codes and close attention to an input device as it is used to enter information are overcome by employment of devices constructed in accordance with the inventive concepts set forth. These features are accomplished by means of the present invention which in response to a human voice signal translates or interprets that signal to produce a set of binary signals which are then employed to operate the input device or similar mechanism. In addition, to determine whether or not the operator has correctly spoken the information to be entered into the input device, the human voice signal is simultaneously fed back via a synthetic voice generating network so that the original voice signal is selectively modified to form a new signal. This new signal is applied to a set of earphones or other device worn or closely adjacent the operator so that a determination may be made as to whether or not the information spoken into the device was correctly spoken and interpreted and will operate the desired device in the correct manner.

In a first embodiment of th device, a synthetic human voice pattern is developed and added to the voice signals produced in response to the spoken words to provide a modified voice signal which is indicative of the manner in which the device has interpreted the spoken words. The modified voice signals are then fed back to the operator who can compare the modified voice signals which are heard with the word that was spoken to determine whether or not the correct information has been entered. The modified voice signals fed back to the operator are, on an actual time scale, fed back after a delay determined by the equipment employed to produce the modified voice signals. However, since the equipment employed to produce the modified voice signals is electronic this delay will be quite short. It has been found that the human brain will treat signals arriving within short periods of one another as arriving simultaneously. Thus if the modified voice signals are fed back to the operator within about 20 milliseconds of the time they were originally spoken, the operator will consider the spoken signals and the modified voice signals as arriving simultaneously. The voice signals developed by the spoken words are also employed to operate the input or similar device.

In a further embodiment, the synthetic human voice pattern is developed in response to the manner in which th spoken voice signals are interpreted and is substituted for the voice signals produced in response to the spoken words. In this manner the voice signals received by the operator are directly indicative of the interpretation of the spoken words.

In still a further embodiment of the device, certain voice signals produced in response to the spoken words are minimized and other voice signals are reinforced so that the voice signals simultaneously fed back to the operator will be a conglomerate of the original spoken voice greatly diminished in selected portions and intensified in others. By comparing the spoken word with that heard via the feedback, it is possible for the operator to determine the manner in which the device has interpreted the original spoken sound.

A further embodiment of the device employs a technique of substitution of certain artificially generated sound patterns for the originally spoken word so that the operator will hear a composed message or pattern of signals indicative of the manner in which the words were interpreted by the device.

It is therefore an object of this invention to provide an improved form of voice operated input device or the like which provides for simultaneous feedback of a modified human voice pattern to the operator to permit a determination by said operator of the manner in which the device has interpreted the original spoken information.

It is another object of this invention to provide a voice operated input device or the like which further includes a feedback loop for simultaneously presenting back to the operator the original spoken words augmented by a synthetically generated voice signal pattern so that the totality of the voice signals fed to the operator represent the manner in which the device has interpreted the word originally spoken by the operator.

It is yet another object of this invention to provide a voice operated input device or the like which further provides a feedback path for substituting for selective portions of the original words spoken by the operator synthetically generated voice patterns so that the operator may be simultaneously apprised of the manner in which the device has interpreted the originally spoken words.

It is still another object of this invention to provide a voice controlled operating device which further includes a feedback path for providing simultaneously produced, selectively diminished and selectively augmented or reinforced sound patterns to the human operator such that the operator may be able to determine the manner in which the device interpreted the original spoken input information.

It is still another object of this invention to provide a voice operated input device or the like which provides operating signals for an associated device as well as the simultaneous feedback of information indicative of the manner in which the spoken words have been interpreted by the input device so that a determination can be made as to the accuracy of the spoken words as well as the accuracy of the interpretation thereof by said input device.

Other objects and features of the invention will be pointed out in the following description and claims and illustrated in the accompanying drawings, which disclose, by way of example, the principles of the invention, and the best modes which have been contemplated for carrying it out.

In the drawings.

Similar elements will be given similar reference characters in each of the respective figures.

Figure 1:
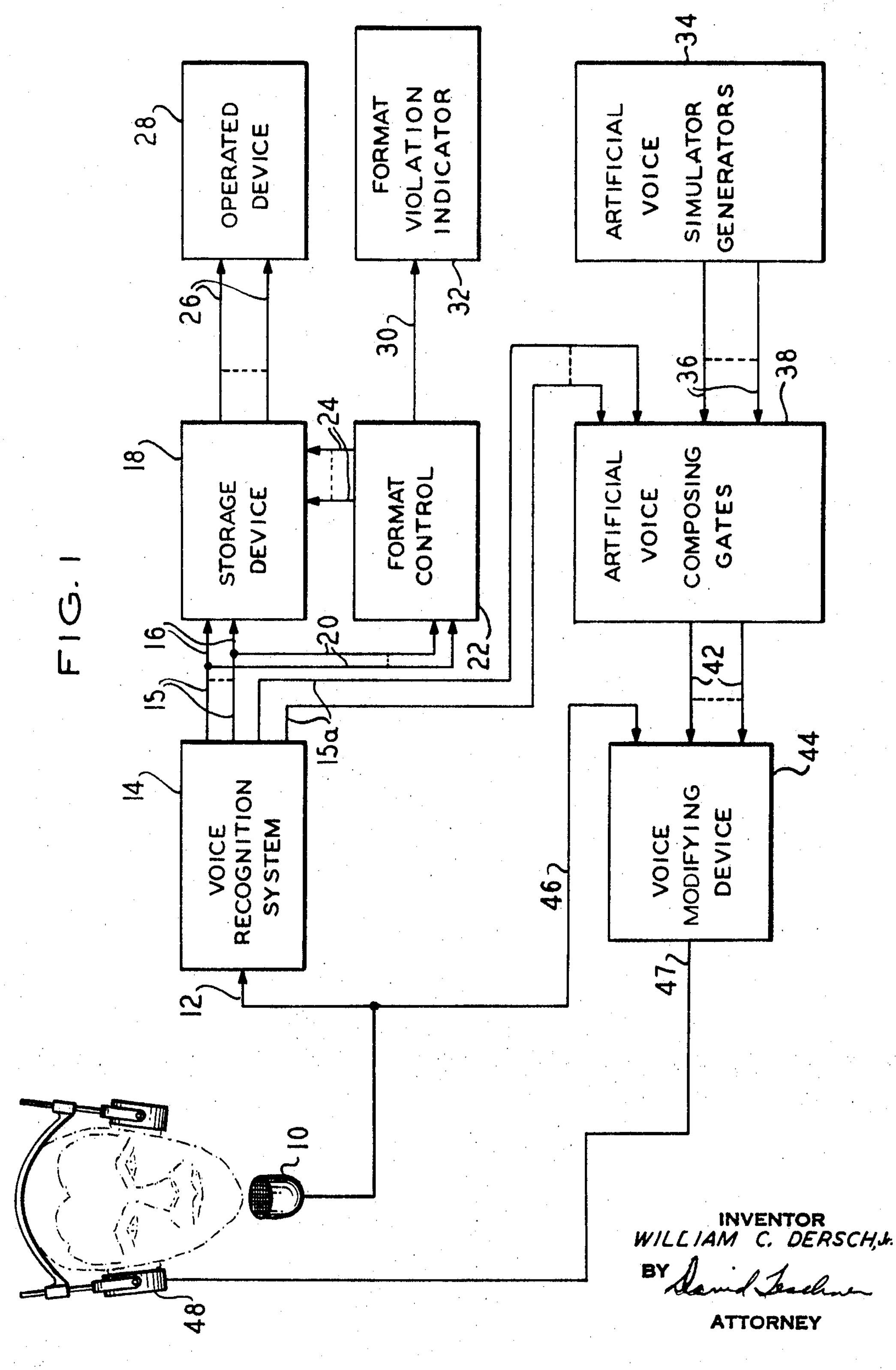
FIG. 1 is an over-all block diagram of a device constructed in accordance with the inventive concepts of this invention.

Turning now to FIG. 1, the basic concepts of the invention are set forth. The spoken words produced by a human operator are converted by means of the transducer 10 from mechanical vibrations to electrical signals. Although a microphone type device is shown as the tranducer 10, it should be understood that any other device capable of converting mechanical pressure wave energy into electrical energy may be substituted therefor. Electrical signals produced by transducer 10 are fed via a line 12 to a voice recognition system 14. As will be described below with reference to FIG. 2, the voice recognition system 14 will segregate the spoken voice signals, represented by the electrical signals on the line 12, into various component portions and provide on its output lines 15 further signals indicative of the interpretation of the received input electrical signals on the line 12. The output of the voice recognition system 14 is conducted via lines 15 and 16 to a storage device 18. In addition, the output of the voice recognition system 14 is fed via the line 20 to a format control 22 which is interconnected with the storage device 18 by means of the lines 24. The storage device 18 which may be a shift register or other suitable storage means will be employed to temporarily store the words of input information while the entire input information sentence or group of words is composed. It will only be at this time that the information from the storage device 18 is transmitted further to control the operated device as will be set forth below. The format control 22 is employed to control the entry of input information into the input device. The format control 22 may be, for example, a device to control the rapidity with which the words are spoken by the operator, so that the ability of the voice recognition system to interpret the spoken words is no exceeded. Additionally, the format control 22 may be used to prevent the operation of the device by certain forbidden or not to be used voice patterns. The movement of the information within the storage device 18 is controlled by the format control 22 via the lines 24 in a manner to be described in greater detail with reference to FIG. 4.

Figure 3:
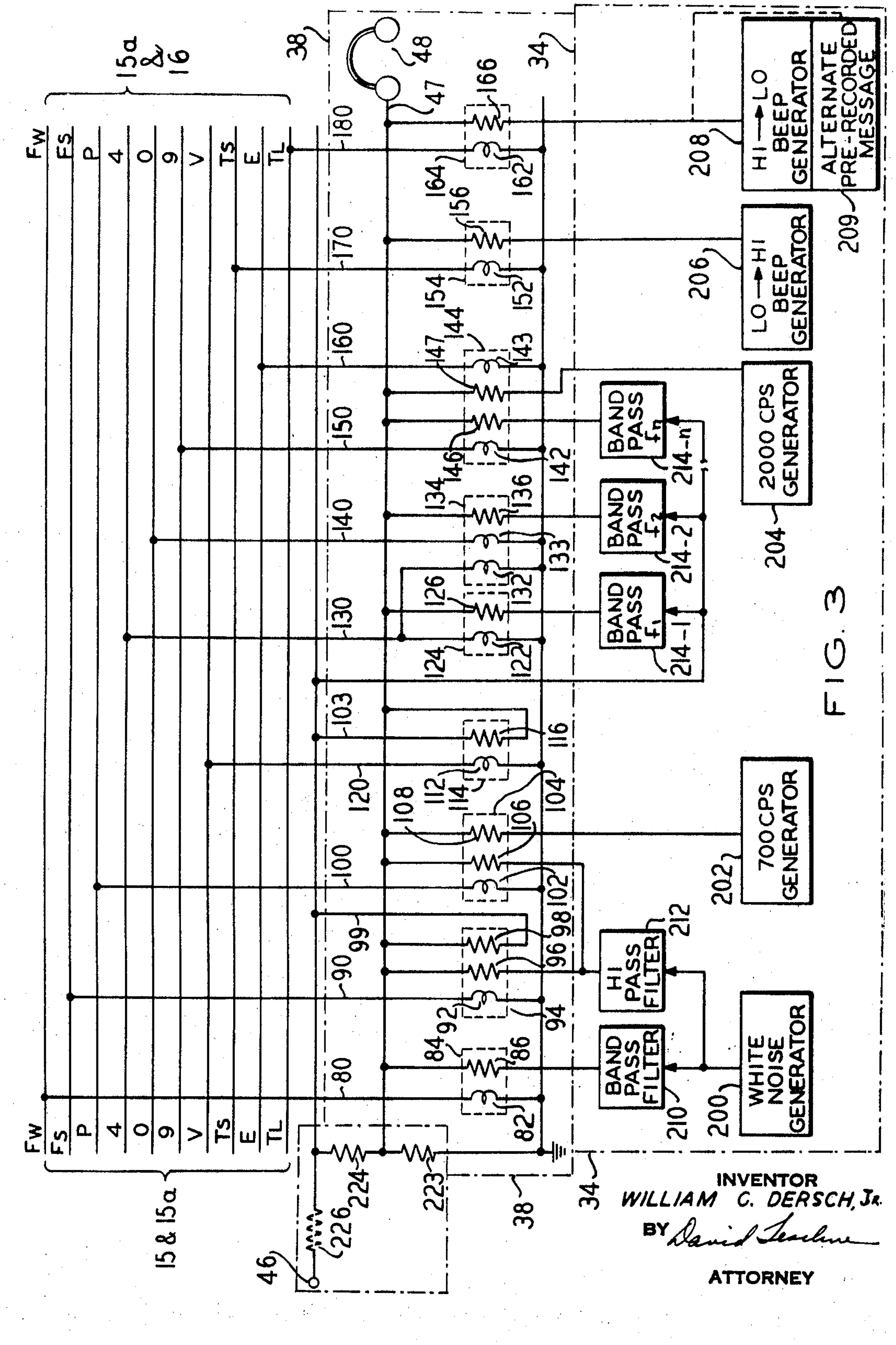
FIG. 3 is a more detailed schematic and block diagram of the artificial voice simulator generators, artificial voice composing gates, and voice modifying device of FIG. 1.

The output of the storage device 18 is fed via the lines 26 to the operated device 28 which it operates. The operated device may be, for example, a sales register or data processing or computing device. The output of the format control 22 is fed via the line 30 to the format violation indicator 32 which may conveniently take the form of a light, a buzzer, a horn, or other device giving a visual, audible or tactile indication that the desired format has been violated, and further indicate in some cases what the violation was. The artificial voice simulator generators 34 consist of a number of devices such as signal generators and noise generators capable of producing component portions of an artificially generated voice pattern. These signals, to be described in greater detail later with reference to FIG. 3, are fed over lines 36 to the artificial voice composing gates 38. The artificial voice composing gates 38 also receive the outputs from the voice recognition system 14 via the lines **15*a*. It should be noted that the signals fed over the lines 15*a* are the signals which are being produced simultaneously and which do not depend upon complete word recognition for transmission to the artificial voice composing gates. In distinction to this the signals fed over the lines 15 to the storage device 18 are provided only after the word has been recognized and is in a condition to be stored. In response to the particular output signals of the voice recognition system 14, which is indicative of the manner in which the system has interpreted the words spoken into the transducer 10, certain portions of the artificial voice signal pattern from the artificial voice simulator generator 34 are conducted through the artificial voice composing gates 38 to output lines 42**.

These gated portions of the artificial voice signal pattern are fed to a voice modifying device 44 which also receives via the line 46 the original electrical signals produced by the transducer 10 in response to the spoken words. The voice modifying device 44, as will be described with reference to FIG. 3, will take on one of a number of possible forms. A first of these forms is an additive form whereby the gated portions of the artificial voice signal patterns are added to or summed with electrical signals produced in response to the spoken word. The resulting modified voice signal is returned via the output line 47 to the headphones 48 worn by the operator. Thus the operator hears simultaneously a composite sound which is his own voice as modified by the manner in which the voice recognition system 14 has understood and interpreted his spoken words.

As will be set forth below in greater detail with reference to FIG. 3, if the operator has spoken the word correctly and the voice recognition system 14 has interpreted the word correctly, and all other elements operate properly, the operator should hear in the headphones a composite word which after some practice and familiarity with the system he is able to interpret as the correct word. No general rule can be given for exactly what the operator will hear as representative of the words which the system may recognize. Each word must be treated on an individual basis and a pattern developed which represents the word when recognized correctly. Once the operator is familiar with the system he will expect not the word but its characteristic pattern to be fed back to his headphones. If he does not receive this pattern he will recognize it immediately as an error condition. The word which is fed back may also give an indication of the type of error made. An example of the way in which the word "eight" is processed is as follows. If the word "eight" is correctly spoken and interpreted, then a 700 cycle tone may be added to the terminal "*t*" of the word as fed back to form a pattern which is "eight" with the 700 cycle tone superimposed on the terminal "*t*." If the operator speaks "eight" into the transducer 10 and fails to get the ending 700 cycle tone he immediately recognizes an error condition e.g. that the terminal "*t*" was omitted. The 700 cycle tone may also be added to the fed back pattern with the word "two" correctly spoken. In this case the 700 cycle tone would be superimposed on the initial "*t*."

A further example of the type pattern which may be fed back as a reuslt of the correct statement of a word in the addition of a soft white noise-like hiss pattern to the "TH" sound of the word "three" if spoken correctly. A soft white noise-like hiss pattern may be added to the fed back pattern of the word "four." In addition selective reinforcement of the "our" portion of four could also be employed. The word "five" will also employ the same soft white noise-like hiss pattern superimposed on the initial "F" and on the voice fricative "ve" portion of a correctly spoken and recognized word "five." An example of the type of feedback pattern available for an incorrectly spoken word is the addition of a sharp and strong white noise-like hiss pattern to the feedback of the word "three" should an "s" be spoken for the opening "TH."

These feedback patterns will be varied in accordance with local variations in speech, pronunciation, idiom and other local speech variations as well as foreign langaugues. Corrections are at times required when the operator is a woman or if a male operator has a cold. As will be described below, the word may be blocked so as not to operate the operated device 28 and the operator may then enter the word again. The operator will then take greater care to enunciate the word more clearly.

In a second form, the voice modifying device 44 may consist of a filtering or attenuating network for minimizing or completely eliminating the electrical signals from transducer 10, representative of the spoken word. With this form of the voice modifying device 44, signals are fed to the headphones 48 which merely represent the gated portions of the artifiicial voice signal patterns. Thus the gated portions of the artificial voice signal patterns have been substituted for the spoken words. If the words have been spoken and interpreted correctly, then the operator will hear a prescribed pattern representative of the spoken word. If not, then the gated artificial voice signal patterns will be indicative of the words as spoken and interpreted. Correction and restatement of the words will be required as before.

In the third form, the voice modifying device 44 may consist of an attenuating network for selectively attenuating portions of the spoken word and for selectively intensifying or reinforcing other portions of the spoken word such that the operator will hear in the headphones 48 a sound pattern which is intensified according to certain spoken portions and diminished as to other spoken portions.

A further form of the voice modifying device 44 may be a message substitution type device wherein the spoken word of the operator is completely attenuated or diminished and a prerecorded message introduced in dependence upon the manner in which the voice recognition system 14 has understood or interpreted the originally spoken words. The message received in the headphones 48 by the operator will instruct him in the manner in which he may correct his statement of the words such that the correct information will be entered.

Provision is made with the system of FIG. 1 for certain words to signify that an error has occurred and to cause the clearing of the storage device 18 to prevent the unwanted transfer of erroneous information to the operated device 28.

To permit a more complete understanding of the device of FIG. 1, the following illustration is given. The operated device 28 will be assumed to be a sales register into which the amount $4.29 is to be entered. The storage device 18 is assumed to be capable of storing three individual words of the input sentence. The format control 22 is arranged to provide for the entry of the three words spoken in a close sequence followed by a fourth longer period of time during which no information should be entered and during which period of time the information entered into the storage device 18 may be erased if erroneously entered. In the event that theinformation is correctly entered at the termination of this period, the information placed in the storage device 18 will be permitted to operate via the lines 26, the sales register 28.

The procedure will be as follows: The operator will speak into the transducer 10 the word "four." The equivalent electrical signals from transducer 10 will pass via the line 12 to the voice recognition system 14 and simultaneously via the line 46 to the voice modifying device 44. The electrical signals received from the transducer 10 will be interpreted by the voice recognition system 14 to provide a series of output signals on the lines **15*a*. The output signals on lines 15*a* will be applied to artificial voice composing gates 38. As a result of the signals from the voice recognition system 14, the outputs of certain of the artificial voice simulator generators 34, which are operating all the time, will be permitted to pass their outputs via the lines 36 and through the artificial voice composing gates 38 to the output lines 42. Thus, depending upon how the voice recognition system 14 has interpreted the input information, via the line 12, certain of the artificial voice composing gates 38 will operate to pass portions of the artificial voice patterns generated by artificial voice simulator generators 34**.

The output from the artificial voice composing gates 38 will then be fed to the second input of the voice modifying device 44, which, as stated above, also receives the output of the transducer 10 via the line 46. If it is assumed that the voice modifying device 44 is operating in the additive mode, then the original spoken words, as converted to electrical signals by the transducer 10, will have added to them the gated portions of the artificial voice signal patterns. The resultant or modified voice signal will be to feed back via the line 47 to the headphones 48 for the operator to compare with the word to be entered. As stated above the operator will hear the fed back modified voice signal simultaneously with the spoken word as retained by the brain of the operator.

When the complete word has been received by the voice recognition system 14, signals will have been provided on the output lines 15 for storage of the word as received and interpreted. The signals will be passed via lines 15 and 16 to the storage device 18 and via lines 15 and 20 to the format control 22.

In the event that the word "four" was stated correctly and was correctly interpreted or recognized by the voice recognition system 14, the output via the line 47 to the headphones 48 will be the pattern expected for the particular spoken word and will be interpreted by the operator as his spoken word "four." If, on the other hand the word were stated such that it sounded like "fou" with the "or" at the end being significantly diminshed then the pattern coming back would be other than the expected pattern. This pattern will advise the operator that the word was incorrectly spoken or incorrectly recognized or interpreted by the voice recognition system 14 and may even indicate the type of error made. Since the speed of operation of elements 10, 14, 38, and 44 are electronic in nature, the signal sent back to the operator's headset 48 is simultaneous with the spoken word so that the operator has full opportunity to compare the word as spoken and the word as heard. As the comparison is being made the output of the voice recognition system 14, as stated above, is also stored in the storage device 18. This word will be stored whether or not it is stated or interpreted correctly. As will be set forth in greater detail below erroneous values stored in storage device 18 may later be destroyed by use of a manual destroy switch or the use of a spoken word such as false.

When the "two" which is the second word to be entered, is spoken the sequence of events as set out above will be repeated and this word will be stored. Finally with the entry of the word "nine" the storage device will be filled and the format control 22 will provide the fourth time period for the destruction of the stored values if an error has occurred. During this fourth period no information may validly be entered into the storage device 18 but a spoken code word or externally applied signal may be applied to the storage device 18 to cause destruction of the values stored to prevent the erroneous operation of the operated device 28 by incorrect values stored in the storage device 18. Should the word be correctly stated and stored in the storage device 18, nothing will be entered during this fourth time period of the format control cycle; and at the expiration of the fourth time period, the information within the storage device 18 will be fed via the line 26*s* to cause the entry of the value 429 into the operated device or sales register 28. Alternately the entry of the first word of the next sentence could be used to transfer the previously entered word to storage providing no error is indicated.

Figures 2, 5:
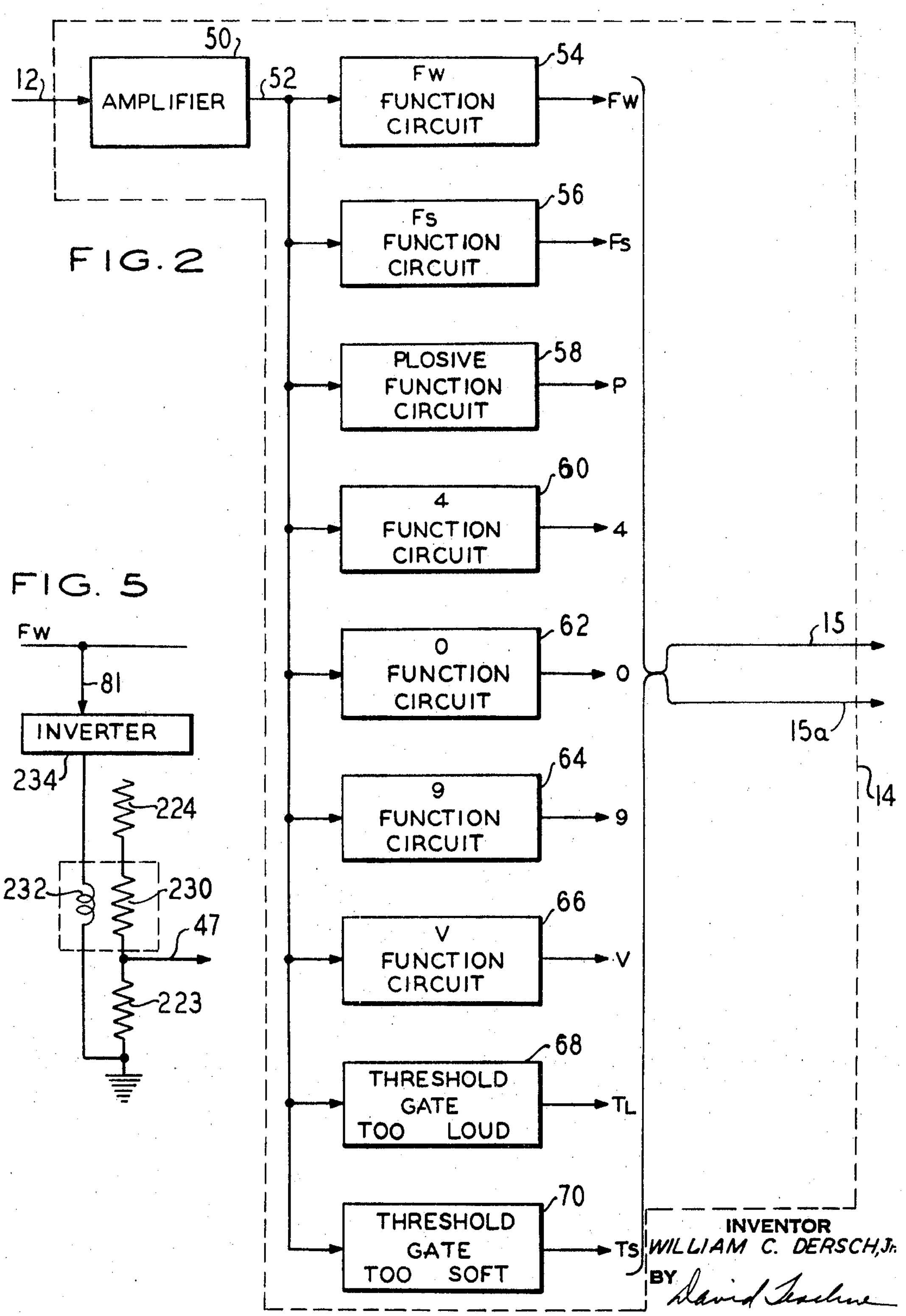
FIG. 2 is a more detailed block diagram of the voice recognition system of FIG. 1.
FIG. 5 illustrates an alternative arrangement of the voice modifying device of FIG. 1.

Turning now to FIG. 2 there is illustrated in more detailed form the component portions of the voice recognition system 14 of the FIG. 1. The spoken words, translated into electrical signals by means of the transducer 10 (FIG. 1), are fed via the line 12 to an amplifying device 50. The output of the amplifier 50 is fed over line 52 and distributed to a series of function circuits 54, 56, 58, 60, 62, 64, and 66, and to the threshold gates 68 and 70. The function circuits 54 through 66 are each arranged to transmit only portions of the output of amplifier 50 and produce signals in accordance with their particular functions. The function circuits 54 to 64 are complex filter networks which are only responsive or transparent to specific characteristics contained in the electrical signals from the amplifier 50. The function circuit 66 or voicing function circuit is responsive to the asymmetric characteristic which characterizes voiced human speech only, and provides a signal whenever such a characteristic is present. The details of the function circuits 54 to 66 are shown and described in detail in U.S. Patent 3,198,884 issued Aug. 3, 1965 to William C. Dersch and incorporated herein by reference.

The output of the function circuit 54 is a signal designated F*w* representing a weak frictional component of the spoken words. Function circuit 56 produces an output designated F*s* representing a strong frictional component of the spoken word. The output of friction circuit 58 represents the plosive component of the spoken word and is designated P. The plosive sounds such as P and T simulate a burst of energy much as an explosion. Function circuits 60, 62, and 64 combinationally produce outputs, 4, 0, 1, and 9, respectively, which represent the OR sound of the word "four," the OH sound of the word "O," the one sound in the word "one," and the sound of the word "nine." The function circuit 66 produces an output V which represents voiced components of the spoken words. The voiced components are those which are actually formed by the vocal cords in distinction to the frictional sounds wherein air is forced from the lungs through constrictions formed by the tongue, teeth and lips. A voiced component of the word "six" would be the "ih" sound whereas the frictional portion would be the initial "s" sound or final "ks" sound.

The threshold gates 68 and 70 are employed to provide indications of the level of the words spoken into transducer 10. Threshold gate 68 produces an output designated TL or too loud. The output of this gate may be coupled to a meter, lamp or other indicating devices to advise the operator to lower his speaking level. Threshold gate 70 produces the output designated TS or too soft. This output may also be coupled to an indicating device to advise the operator to increase his speaking level.

In the article "Shoebox—A Voice Responsive Machine" appearing in Datamation magazine, June 1962, by William C. Dersch, the theory for the breakdown of spoken words into the above mentioned components is set forth. It was found that all of the words then investigated could be broken down into codings according to their voiced and non-voiced or frictional portions. An array of function circuits could be established such that signals would be provided in accordance with the presence of the voiced and frictional sounds. Certain sounds such as the "OR" and "OH" required special attention and extra function circuits for these complex sounds. The outputs of the function circuits would then be employed to operate an output device. The output signals from the voice recognition system 14 are fed over the lines 15 and 15*a* as set out above.

At this time some refinement should be made to the use of the term "word" as used herein. The term "word" represents a shorthand notation of a far complex phenomenon which is being widely studied. The response of the voice recognition system 14 and consequently the resulting feedback do not depend upon the existence of a complete word in all instances but can be dependent upon component voiced and non-voiced portions of the word. These component portions are termed phonemes. The recognition of any word will depend upon the characteristics of the individual word. Some words can only be recognized after the complete word is available. Other words can be recognized upon receipt of a number of phonemes, but less than the entire word. In other instances a more complete arrangement of phonemes and other word components are needed to understand the word. This latter mixture of phonemes and other word components are termed phoneme-like speech events. It is not possible to recognize a particular word until the components necessary for recognition of that word have been received. Thus for some words the recognition and feedback may take place before the entire word has been received and processed while others may require the full word to be received and processed. Since the input speech signals are serial, the device is free to operate as soon as it can recognize the received word. The term "word," therefore, as used herein will be construed to include the components necessary to identify a particular word whether or not a particular word is required.

Referring now to FIG. 3, the construction and operation of the artificial voice simulator generators 34, the artificial voice composing gates 36, and the voice modifying device 44, will be set forth. As can be seen from the figure, the artificial voice simulator generators 34 consist of a plurality of separate generators and a series of high-pass and band-pass filters. A first of the generators is a "white" noise generator 200 which operates in the audio range from 100 c.p.s. to 6 kc. and produces a substantially uniform power output for all frequencies within its spectrum. The output of the white noise generator 200 is applied to a band-pass filter 210 and a high-pass filter 212. The band-pass filter 210 and high-pass filter 212, as well as the filters described with reference to FIG. 2, may be constructed of RC networks as is well-known in the art and may be for example M derived filters or other similar types of filter devices. Generator 202 provides a 700 cycle per second tone, whereas generator 204 provides a 2000 cycle per second tone. The generator 206 is a low-high beep generator which provides an output signal of constant frequency which is alternately low in amplitude and then high in amplitude. Alternatively, this device may provide a constant amplitude output of low then high frequency. The generator 208 is a high-low beep generator which provides an output of constant frequency which is alternatively of high amplitude followed by low or alternatively of constant amplitude but of high frequency and low frequency outputs. In addition, there are a plurality of band-pass filters 214–1, 214–2, through 214–N. These filters, depending upon their particular band-pass characteristics, will pass signals applied to it from the voice line as will be described below.

The artificial voice composing gates 38 consist of a plurality of lamp-photoconductor gate assemblies 84, 94, 104, 114, 124, 134, 144, 154, and 164. Each of these assemblies has at least one lamp and one photoconductor. For example, the lamp-photoconductor gate assembly 84 consists of a lamp 82 and a photoconductor 86. The arrangement of the lamp and photoconductor are such that with the lamp 84 in the nonoperated or dark condition, the photoconductor material 86 will act as a high impedance or open circuit and will thus prevent the passage of signals from the band-pass filter 210 to the output line 47. However, upon the application of a signal to the F*w* line, this signal will be passed via the line 80 to cause the ignition of the lamp 82 and cause it to light the surface of the photoconductor 86. As a result of the lamp impinging upon the photoconductor, its impedance will change such that it becomes virtually a short circuit and will thus pass the signal from the band-pass filter 210 to the output line 47. The lamp 82 is coupled via line 80 to the F*w* output of filter 54 of FIG. 2, while photoconductor 86 is coupled between the output line 47 and band-pass filter 210. Thus in the presence of a weak frictional signal output F*w*, the output of the white noise generator 200 will be applied via the band-pass filter 210 and the photoconductor 86 to the output line 47. The lamp-photoconductor assemblies 114, 124, 154, and 164 similarly have a single lamp and a single photoconductor.

Each of the remaining lamp-photoconductor assemblies has at least one photoconductor together with a lamp. Some of the assemblies have a plurality of lamps or photoconductors or both. Lamp-photoconductor assembly 94 has a single lamp 92 and two photoconductors 96 and 98, whereas the lamp-photoconductor assembly 134 has two lamps 132 and 133, and a photoconductor 136. Lamp-photoconductor assembly 144 has two lamps 142 and 143, and two photoconductors 146 and 147. In the event other filters 214 are placed between filters 214–2 and 214–N, additional lamp-photoconductor assemblies would be employed.

In response to an F*s* signal from the F*s* filter 56 of FIG. 2, a signal will pass via the line 90 to cause the lamp 92 to be operated and cause the photoconductors 96 and 98 to both go into their conductive or short circuited condition. As a result of the photoconductor 96 going into its conductive condition the output of the white noise generator 200 will pass via the high pass filter 212 and the photo-conductor 96 to the output line 47. The conduction of the photoconductor 98 will permit the signal on the voiceline 46 to be conducted to the output line 47.

A plosive sound or P output from the P filter 58 of FIG. 2, will pass via line 100 to light lamp 102 causing photoconductors 106 and 108 to conduct. As a result of the conduction of photoconductor 106 the output of the white noise generator 200 will be passed via the high-pass filter 212 to the output line 47. The conduction of photoconductor 108 will cause the passage of the 700 cycle tone from the generator 202 to the output line 47. The presence of the voicing or V output from the V filter 66 of FIG. 2, will cause the lamp 112 of assembly 114 to be lit via the line 120. The lighting of lamp 112 will cause photoconductor 116 to conduct the voice signals from line 46 to the output line 47.

The voice signals on the line 46 will be applied to the band-pass filters 214–1 to 214–N in parallel. Each filter, depending upon its particular band-pass range, will apply signals to its associated lamp-photoconductor gate assembly, which gates will provide outputs in dependence upon the outputs of the voice recognition system 14. The number of band-pass filters 214 as well as their pass-bands will depend upon the vocabulary with which the system is to be operated. Thus the presence of the 4 output from filter 60 of FIG. 2 will be applied via line 130 to lamp 122 to cause it to light which in turn causes photoconductor 126 to conduct and pass the output of band-pass filter 214–1 to the output line 47. The 4 output is also applied to lamp 132, which when lit causes photoconductor 136 to conduct and apply the output of filter 214–2 to the output line 47. Additionally photoconductor 136 can be made to conduct by lighting lamp 133 in response to a signal on line 140 which in turn is connected to the 0 line which receives the 0 output from band-pass filter 62. The photoconductors 146 and 147 of the lamp-photoconductor assembly 144 can be made to conduct due to the presence of either the 9 output from the 9 filter 64 of FIG. 2 via line 150 which lights lamp 142 or the presence of the end output from the register stage 416–6 of FIG. 4 to be described below via line 160 which lights lamp 143. Photoconductor 146 will conduct the output of band-pass filter 214–N to the output line 47 whereas photoconductor 147 will conduct the output of the 2000 cycle generator 204 to the output line 47.

The TS output from the TS threshold gate 70 of FIG. 2 will be applied via line 170 to light lamp 152 and cause photoconductor 156 to conduct the output of the low-high beep generator 206 to the output line 47. The TL output from the TL threshold gate 68 of FIG. 2 will be applied via line 180 to light lamp 162 and cause photoconductor 166 to pass the output of the high-low beep generator 208 to the output line 47. As an alternative, the high-low beep generator 208 may be replaced with a playback device 209 capable of playing back prerecorded messages to advise the operator that he is speaking too loudly. It should be understood that any or all of the generators 200, 202, 204, 206, and 208 may be similarly replaced. It should also be understood that, although the artificial voice composing gates 38 are shown as lamp-photoconductor assemblies, any other suitable form of gating circuit employing vacuum tubes, diodes, transistors, or the like may be employed.

The voice modifying device 44 operating in the additive mode may be constructed employing the resistors 223 and 224 which together form a mixing circuit for mixing or adding the input voice signal on the line 46, from the output of the transducer 10, with the output signals from the various artificial voice composing gates 38. The voice signal from the line 46 will be applied across the resistor 224 whereas the output from the artificial voice composing gates 38 will be developed across the resistor 223, the sum total being applied to the line 47 coupled to the connection between resistors 223 and 224. Thus the signal applied to the headphones 48 will be the composite of the signals produced by the transducer 10 and the artificial voice composing gates 38.

If it is desired to employ a voice modifying device 44 operating in the substitutional mode, then a further resistor 226 can be added between the line 46 and the connection point of resistors 223 and 224 to substantially diminish or attenuate the signal received from the transducer device 10. In this manner, effectively only the outputs from the artificial voice composing gates 38 will be applied to the line 48. In that the original signal from the transducer 10 is greatly diminished or attenuated by the effects of the resistor 226 the operator will hear in his headphones 48 ostensibly the complete replacement or substitution of the original spoken sound by the artificially generated sound.

A further embodiment of the voice modifying device for use in the selective attenuation and amplification mode is shown in FIG. 5. In this arrangement the resistors 224 and 223 are separated by a photoconductor 230 arranged to be normally illuminated by a lamp 232 connected at one terminal to ground and a second terminal to an inverter 234 and in turn connected via a line such as 81 to selected ones of the input lines such as Fw. With this arrangement, the appearance of a signal on, for example line 81, will cause inverter 234 to stop supplying a signal to lamp 232 and cause it to be extinguished. As a result photoconductor 230 will go to its high impedance state and prevent the voice signal from being added or mixed with the signals across resistor 223. As a result the output signal to the line 47 would be determined by the signal applied from the artificial composing gates 38. In the absence of signals from any one of the circuits to which the inverter 234 is connected, the lamp 232 will remain conducting and will cause the photoconductor 230 to provide a short circuit conductive path between the resistors 224 and 223 causing them to act in a manner as described above with respect to FIG. 3.

Figure 4:
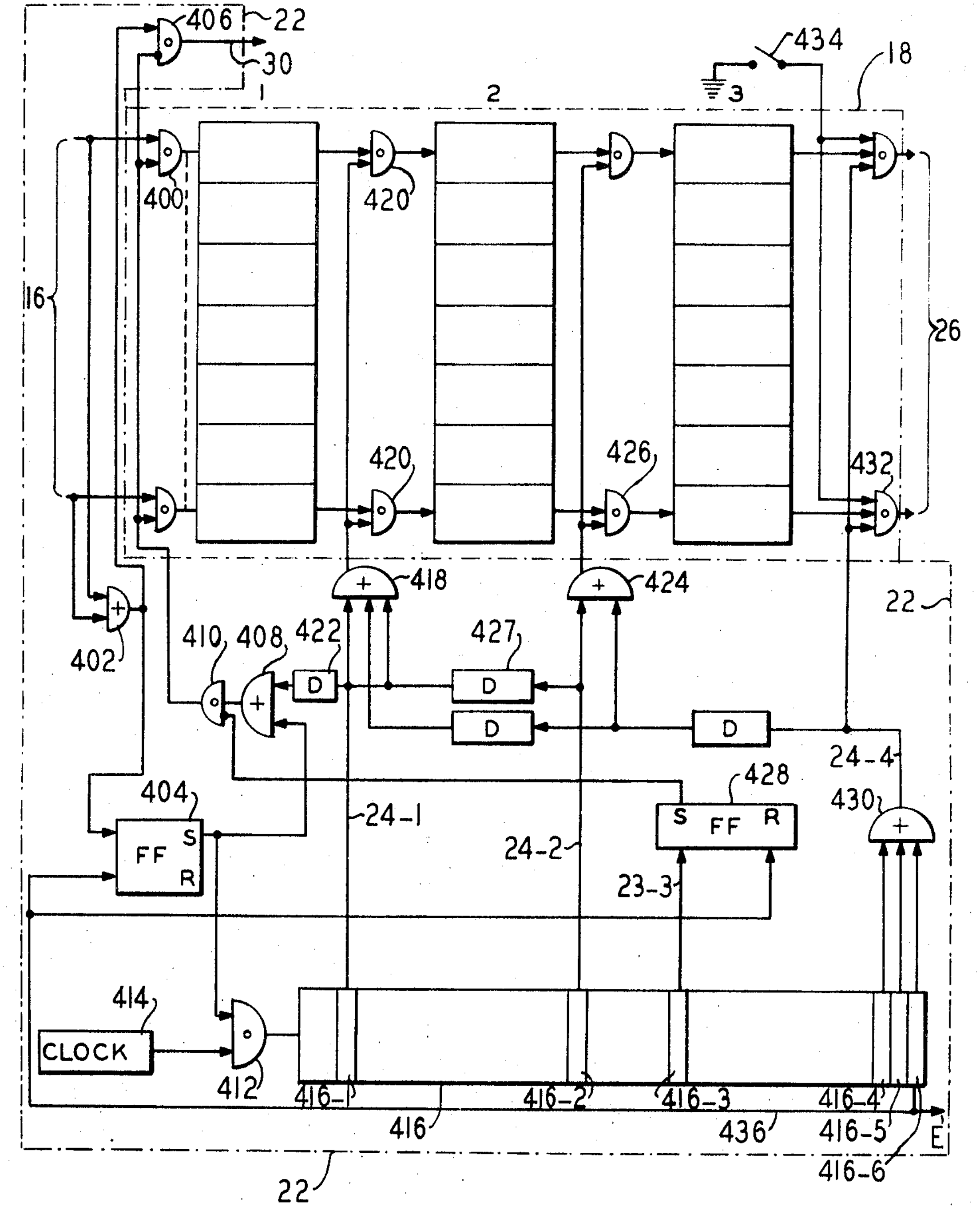
FIG. 4 is a more detailed block diagram of the storage device and format control of FIG. 1.

Turning to FIG. 4, the arrangement of the storage device 18 and the format control 22 are now set forth. The output from the various function circuits 54 through 66 of FIG. 2 are fed via the lines 16 to the input And gates 400 of the storage device 18. Although only the first and last And gates 400 are illustrated, the dashed lines joining their inputs and outputs indicate a number of gates 400 are present. This manner of illustration is employed to simplify the drawings. A similar notation is used for the other elements of FIG. 4 which appear in multiple. In addition, the signals fed on the lines 16 are introduced to an Or gate 402 to detect the presence of signals on any of the lines 16. The output of the Or gate 402 is fed to the set input terminal of a flip-flop 404 as well as to a format control And gate 406. As will be set forth below, the output of the And gate 406 is employed to control the format violation indicator 32 via output line 30. The set output terminal of the flip-flop 404 provides a first input to the Or gate 408 whose output is fed through a further And gate 410 to provide a set of read-in signals to the input And gates 400 to permit the entry of information from the lines 16 into the first stage of the storage device 18. Thus, with the arrangement described, it is the presence of signals on the lines 16 which initiates the storage operation and starts the format control time cycles for the storage of information. The set output of the flip-flop 404 is also fed to a first input of an And gate 412 which receives at its second input the clock signals available from a clock source 414. The clock source 414 may be a separate source of clock signals of desired repetition rate or may be part of an associated computer or data processing system or the like. The output of the And gate 412 is fed as a series of count signals to a counter 416. The number of stages within the counter are sufficient to allow storage of information within the storage device 18. At the end of a first time period, the counter will arrive at the count stage 416–1 at which time it will issue a signal via the line 24–1 to operate the Or gate 418. The output of the Or gate 418 is coupled to a set of transfer And gates 420 which control the transfer of information from stage 1 of the storage device 18 to stage 2 thereof. The signal on the line 24–1 is also applied to a delay line 422 which after a sufficient delay will apply a signal to the Or gate 408 which again will permit the entry of further information into stage 1 of the storage device 18. Thus, after sufficient time has elapsed for the transfer of information to stage 2 from stage 1 of the storage device 18, the input And gates 400 to stage 1 of the storage device 18 will again be operated to permit the entry of further information into stage 1.

Further clock signals from the clock 414 will cause the counter 416 to progress until it reaches the count stage 416–2. Upon reaching stage 416–2 a further signal will be emitted over the lines 24–2 to the Or gate 424 which in turn will operate the transfer And gates 426 to permit the transfer of the contents of stage 2 of the storage device 18 to stage 3. Additionally, the signals on the lines 24–2 are fed via a delay means 427 to the Or gate 418 to permit the operation of the transfer And gates 420 and cause the transfer of information in stage 1 to stage 2. Additionally, the output signal from the delay 427 will be applied to the delay 422 to permit the operation of the Or gate 408 to control the entry of information into stage 1 of the storage device 18, after the transfer from stage 1 to stage 2 has been completed.

The counting by counter 416 will continue until the count stage 416–3 is reached at which time a signal will be issued on the line 24–3 to set the flip-flop 428 to its set condition. The set output of flip-flop 428 will be applied to an inhibit terminal of the And gate 410 to prevent the further entry of information into stage 1 of the storage device 18. This will begin the so called fourth time period, during which the operator will have the option of destroying the information then stored in the storage device 18 or allowing the information to be transferred automatically once the fourth time period has elapsed. The counting will continue until the counter arrives at the stage 416–4 the end of the fourth time period at which time a pulse will be applied to the Or gate 430 which supplies a signal to the line 24–4 to cause the transfer of information from stage 3 of the storage device 18 to the operated device 28 via the And gates 432 and the lines 26. The information in stages 1 and 2 will be advanced one stage each by the signal from count stage 416–4 as described above. In the event that the information was erroneous and should have been destroyed, the destroy switch 434 will be depressed during this fourth time period to cause the inhibiting of the And gates 432 so that the information may not be transferred to the operated device 28.

The counter 416 will now progress to the following count stages 416–5 and 416–6 during which time the information will successively be transferred from stage 1 to 2 to 3, etc. Finally, an output will be furnished via the line 436 from the count stage 416–6 which will cause a resetting of the flip-flop 404 to prevent the further transmittal of clock pulses to the counter 416 and will also cause a resetting of the flip-flop 428 for the next operation, and provide the end signal to the end input line of FIG. 3.

As mentioned above the And gate 406 is used to control the format and provide the signal on line 30 to the format violation indicator 32. It can be seen that one of the inputs to And gate 406 is an inhibitory input supplied by the output of the And gate 410. The second input to the And gate 406 is supplied by the output of the Or gate 402. The input from the Or gate 402 is available each time information is applied to the line 16. Any information placed on these lines will cause the format violation indicator 32 to be operated unless it is a time during which information may be properly entered as indicated by the presence of the inhibitory signal on the second input to the And gate 406. It should be recalled that the output of And gate 410 is the readin control signal and thus available when a valid readin is permitted. In addition to employing a mechanical switch 434, as shown, for the destroy switch, the voice recognition system 14 may be arranged to provide a verbal destruction signal such that will cause the destruction of the store information in response to a spoken word.

Now that the various components of the input system have been described in detail, an example will be given to show the manner of operation of the device. Assuming the number four is to be entered into the operated device 28 the operator would speak into the transducer 10 the word four. The output of the transducer 10 would be applied over the line 12 and simultaneously over the line 46. At this time the output of the transducer 10 on the line 46 would have no effect. The voice recognition system 14 upon receipt of the signals on the line 12 would amplify them by means of the amplifier 50 and provide signals on the line 52 to the various function circuits 54 through 66 and the threshold gates 68 and 70. Since the word four is constructed of a voicing portion, the function circuit 66 would produce a signal on the V line, additional the Or component is present and the function circuit 60 would produce a four output signal and finally because of the weak frictional sound of the opening F of the word the functional circuit 56 would produce the F*w* sound. These signals would appear in serial order as F*w*, V, and 4. These outputs will be applied serially via the lines **15*a* to the artificial voice composing gate 38**.

The F*w* signal appearing on line F*w* of FIG. 3 would be applied via the line 80 to the lamp 82 causing it to be lit. As a result of this lamp lighting the photoconductor 86 would be placed in a conductive state. The output of the white noise generator 200 would then be passed via the band-pass filter 210 and the photoconductor 86 to the output line 47 to provide the soft hiss noted above. The OR or 4 signal of the four would be applied via the line 130 to the lamp 122 of the lamp-photoconductor gate assembly 124 to cause it to light and to pass via the now conductive photoconductor 126 the output of the band-pass filter 214–1. Since this filter receives the voice signal itself from the line 46 it will again serve to intensify the original spoken sound giving additional reinforcement. Additionally, the signal on the line 130 is applied to the lamp 132 of the lamp photoconductor gate assembly 134 to render the photoconductor 136 conductive and thereby pass the output of band-pass filter 214–2 to the output line 47. Since this filter also receives its input from the voice signal line 46 its output will again serve to intensify or reinforce the originally produced voice signal. The voiced signal V would produce a signal on the line 120 which will cause the lamp 112 of the gate assembly 114 to be lit. This will permit the introduction of a further portion of the voice signal on line 46 to the output line 47 via the now conductive photoconductor 116.

As a result of the interpretation or recognition the word four by the input device the originally spoken word would be greatly reinforced in that a number of individual gate assemblies are now conducting to the output line 47 the original voice signals as well as a soft hiss produced by the white noise generator 200. The composite output signal would be fed simultaneously to the headphones 48 and the operator would hear in the headphones 48 a signal pattern representative of the correctly spoken word four. Any deviations from the correct speaking of the word four would introduce other components so that the signal heard might consist of a conglomerate of beeps, tones, and selectively amplified or diminished voice signals dependent upon the manner in which the device was able to interpret or to recognize the input sounds.

In addition to being fed to the artificial voice composing gates 38 the signal on line 15 is also fed via line 16 and 20 to the storage device 18 and the format control 22. This signal will be stored in the first stage of the storage device 18 and then under control of the format control 22 will be stepped along to the second stage and the initial stage of the storage device 18 made ready to accept further information. The entry of information in this manner will continue for the following two-digit words (assuming a three-digit or three-word sentence is to be entered) and then a fourth time period will commence during which time the operator will have the option of destroying the information stored if erroneous or permitting the period to elapse at which time the information will automatically be transferred from the storage device 18 to operate the operated device 28.

It should be understood that the three-word sentence was employed as illustrative of the device and it is not intended to limit the utility of this device to any fixed number of words or particular format.

While the preferred embodiment of this invention has been described it should be understood that various changes, omissions and additions may be made to the device as described, by those skilled in the art without departing from the spirit or scope of this invention.

What is claimed is:

1. Signal translating means comprising: input means for receiving human voice signals and producing first signals indicative thereof; conversion means coupled to said input means and responsive to said first signals for producing gating signals in accordance with said first signals; signal generating means for producing a plurality of second signals; gating means having an output terminal, said gating means being coupled to said conversion means and to said signal generating means and being responsive to said gating signals for selectively gating to said output terminal said second signals in accordance with said gating signals; output means; modifying means coupled to said input means, said gating means output terminal and to said output means and responsive to said gated second signals and said first signals to modify said first signals in accordance with said gated second signals and present said modified first signals to said output means substantially simultaneously with the occurrence of said first signals.

2. Signal translating means as defined in claim 1, wherein said modifying means comprises a summing means for summing said first signals and said gated second signals.

3. Signal translating means as defined in claim 1, wherein said modifying means comprises a substitution means for attenuating said first signals and combining said attenuated first signals with said gated signals whereby said modified first signals are substantially equivalent to said gated second signals.

4. Signal translating means comprising: input means for receiving human voice signals and producing first signals in accordance therewith; interpreting means coupled to said input means and responsive to said first signals for producing gating signals in accordance with the interpretation by said interpreting means of said first signals; a plurality of signal generating maens, each capable of producing component portions of a human voice signal spectrum; gating means having an output terminal, said gating means being coupled to said interpreting means and said plurality of signal generating means and responsive to said gating signals to gate to said output termial one or more of said portions of a human voice signal spectrum in accordance with the interpretation of said first signals by said interpreting means; modifying means coupled to said gating means output terminal and said input means and responsive to said portions of a human voice signal spectrum and said first signals to modify said first signals in accordance with said gated portions of a human voice signal spectrum; and output means coupled to said modifying means for providing output information signals representative of said modified first signals and thereby provide an indication of the manner in which said interpreting means interpreted said first signals.

5. Signal translating means comprising: input means for receiving human voice signals and producing first electrical signals in accordance with said human voice signals; interpreting means coupled to said input means and responsive to said first electrical signals for producing second electrical signals in accordance with the interpretation of said first electrical signals; a plurality of signal generating means each capable of producing discrete electrical signal patterns; gating means having an output terminal, said gating means being coupled to said interpreting means and said plurality of signal generating means and responsive to said second electrical signals to gate to said output terminal one or more of said discrete electrical signal patterns; modifying means coupled to said gating means output terminal and said input means and responsive to the gated discrete electrical signal patterns and said first electrical signals to modify said first electrical signals in accordance with said gated discrete electrical signal patterns; and output means coupled to said modifying means for providing human intelligible output information signals representative of said modified first electrical signals and thereby permit a determination of the manner in which said interpreting means interpreted said first signals.

6. The method of checking the interpretation of human voice signals comprising the steps of converting human voice signals into a series of corresponding first electrical signals; interpreting selected ones of said corresponding first electrical signals and providing second electrical signals indicative of the interpretation of said first electrical signals; converting said second electrical signals to complex human voice signals and providing the same as output signals which occur substantially simultaneously with said human voice signals whereby the manner in which a spoken word is being interpreted can be monitored while the word is being spoken.

7. The method of checking the interpretation of human voice signals defined in claim 6 including the step of mixing said first signals with said second signals to provide said output signals.

8. A system for controlling apparatus in response to a spoken word comprising in combination: first signal generating and voice recognition means responsive to the sounds making up a spoken word to produce first output signals representative of said sounds; and second signal generating means coupled with said first means and responsive to said sounds and to said first output signals to generate human intelligible monitoring signals indicative of the manner in which said first means has interpreted the sounds making up a word, said monitoring signals being produced substantially simultaneously with the application of said sounds to the system whereby an operator is immediately made aware of the manner in which his spoken word is being interpreted by the system.

9. The system of claim 8 wherein said second means includes sound generating means providing audio output signals.

10. The system of claim 8 wherein said second means includes a voice modifying device connected to said first means, sound generating means connected to said device, and control means connected to said first means and to said device and responsive to said first signals to control said sound generating means for the generation of modified voice signals representative of the manner in which the original spoken sounds are being recognized by said first means.

11. A voice controlled system comprising in combination: first signal generating means responsive to human voice signals to provide first electrical signals representative thereof; speech sound recognition circuit means coupled to said first means and operative to provide a plurality of recognition signals in serial fashion as the signals from said first means representing the speech sounds of a word being formulated are applied thereto; machine control means connected to said recognition circuit means and responsive to said recognition signals identifying a selected word to operate the associated machine in a predetermined manner; human intelligible output signal generating means; and output signal control means connected to said first signal generating means, to said output signal generating means, and to said speech sound recognition circuit means and responsive to each recognition signal in said plurality to control the character of said output signals substantially simultaneously with generation of said first signals, whereby an operator can perceive the manner in which a spoken word is being interpreted by the system substantially simultaneously with the speaking of the word.

12. The system of claim 11 wherein said machine control means includes a signal storage device connected to said speech sound recognition circuit means and operative to store a plurality of said recognition signals corresponding to a complete word.

13. The system of claim 11 wherein said output signal control means includes voice simulation signal generating means, signal mixing means connected to said first signal generating means and to said simulation signal generating means to provide composite signals to said output signal means, and signal gating means connected to said recognition circuit means and said mixing means to control the make-up of said composite signal in response to said recognition signals.

14. A system for recognizing a spoken word and substantially simultaneously providing to the speaker an indication of the manner in which the individual sounds making up the word are being recognized by the system comprising in combination: signal input means; first signal recognition circuit means connected to said input means and responsive to input signals representing the sounds making up a spoken word to provide in serial fashion a plurality of output identification signals representing the identification of selected individual sounds making up the word; human intelligible output signal generating means; and output signal control means connected to said output signal generating means and to said first signal recognition circuit means and causing said output signal generating means to provide an output signal indicative of the manner in which said individual sounds have been recognized, said output signals being generated substantially simultaneously with the occurrence of said identification signals and controlled thereby.

References Cited

UNITED STATES PATENTS

| | | | |
|---|---|---|---|
| 3,114,980 | 12/1963 | Davis | 340—146.3 |
| 3,158,685 | 11/1964 | Gerstman et al. | |
| 3,166,640 | 1/1965 | Dersch. | |
| 3,271,738 | 9/1966 | Kamentsky | 340—146.3 |
| 3,349,179 | 10/1967 | Klein | 179—1.7 |

OTHER REFERENCES

Dersch: IBM Tech. Discl., vol. 5, No. 8, 1963.

KATHLEEN H. CLAFFY, Primary Examiner

ARTHUR A. McGILL, Assistant Examiner

U.S. Cl. X.R.

340—146.3